Feb. 9, 1954　　　L. H. STANFORD　　　2,668,688
CABLE LASHING MACHINE

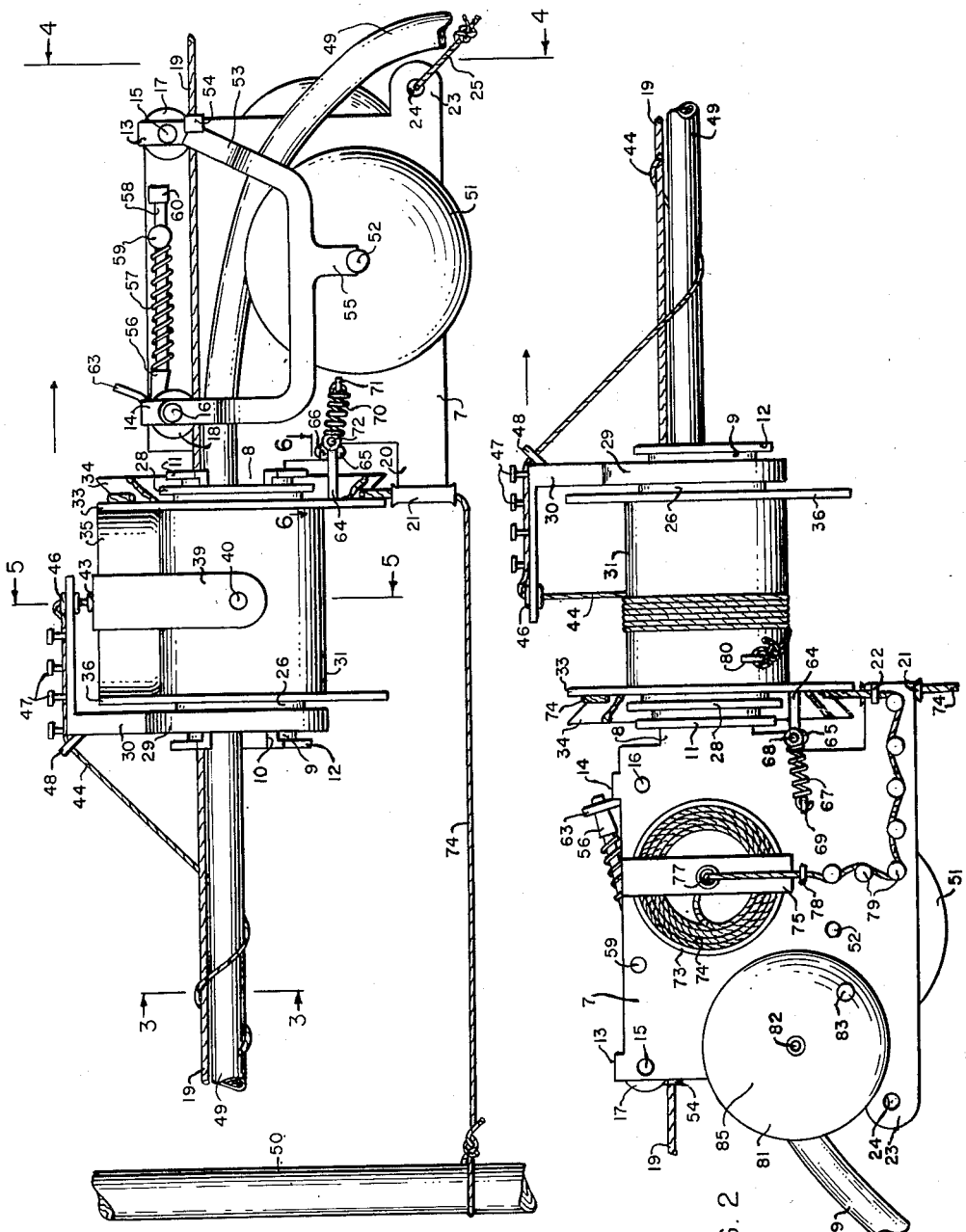

Filed Jan. 11, 1951　　　　　　　　　　　2 Sheets-Sheet 2

INVENTOR.
LELAND H. STANFORD
BY
Harry M. Saragovitz
Attorney

Patented Feb. 9, 1954

2,668,688

UNITED STATES PATENT OFFICE 2,668,688

CABLE LASHING MACHINE

Leland H. Stanford, Arlington, Va.

Application January 11, 1951, Serial No. 205,591

5 Claims. (Cl. 254—134.3)

(Granted under Title 35, U. S. Code (1952), sec. 266)

The invention described herein may be manufactured and used by or for the Government for governmental purposes, without the payment to me of any royalty thereon.

The present invention relates to the installation of aerial cables, and to means whereby the cables may be secured to a messenger or supporting strand.

Specifically, the invention relates to cable lashing machines, by which a lashing is spirally wound about a messenger strand and a cable or cables, or about a number of cables or wires so that the messenger strand or one of the wires or cables supports the lashed assembly.

The objects of my invention are:

First, to provide a cable lashing machine having a positive drive so that the machine does not rely upon traction on the messenger strand or upon manual effort from an operator on the ground beneath it to accomplish winding of the lashing, but the lashing action is positive and results from the forward progress of the machine;

Second, to provide a relatively simple machine which is light in weight, requiring relatively little maintenance care and inexpensive to manufacture;

Third, to provide a lashing machine which will employ any of a wide variety of flexible lashings and/or driving lines;

Fourth, to provide such a lashing machine which will lash not only a multi-conductor cable, but also a plurality of individual conductors;

Fifth, to provide a lashing machine which will operate over any kind of messenger wire such as a single bare wire or a larger stranded wire as used commercially for that purpose;

Sixth, to provide a lashing machine that will lash through long spans without other attention from the ground than the tractive power to draw the machine along the messenger strand;

Seventh, to provide a lashing machine which will unlash cable which has been secured to a messenger strand, and thus clear the strand for supporting a replacing cable.

Other objects and features of the invention are obtained by a mechanism, one embodiment of which is illustrated in the accompanying drawings, in which:

Fig. 1 is a right side elevational view of the machine arranged for cable lashing, with part of sheave and drive wire broken away for purposes of clarity;

Fig. 2 is a left side elevational view of the machine with the lashing wire cup and the locking strap removed as for cable unlashing with part of sheave and drive wire broken away for purposes of clarity;

In the various figures of the drawings, like numbers refer to similar parts.

Figure 5:
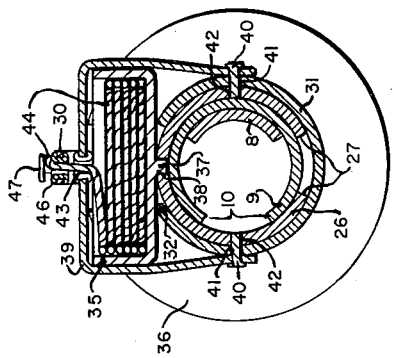
Fig. 5 is a vertical section taken along the line 5—5 of Fig. 1, showing the relationship of the fixed and rotary sleeves and the slotted construction thereof.

For purposes of clarity and to more readily recognize the various components of the subject device, it will be assumed that the front of the device, as shown in Fig. 1, is that part where the cable is brought up from the ground, and that the right side of the device is that portion containing the wheel over which the cable rides as seen in Fig. 1.

Referring to Fig. 1 of the drawings where the device is shown as arranged for cable lashing and moves in the direction as indicated by the arrow, there is shown a plate 7 which is provided at its rear edge with a tongue 8 to which is secured a fixed sleeve 9. The sleeve 9 is provided with a longitudinal slot 10 and has a similarly slotted retaining flange 11 at its forward end and a similarly slotted retaining collar 12 at its rear end. Along its upper edge, the plate 7 is provided with a forward rider wheel support 13 and a rear rider wheel support 14, which support axles 15 and 16, respectively. Rotatable upon axles 15 and 16 are rider wheels 17 and 18, respectively, so arranged that the said rider wheels revolve upon a messenger strand 19, which is secured at each of its ends to separate poles (one pole 50 being shown) between which a cable 49 is to be secured. The sleeve 9 is positioned so that it encircles, but does not touch, the said messenger strand 19.

As seen in Figs. 1 and 2, the lower edge of plate 7 has a rear extension to form an arm 20 to which wire guides 21 and 22 are attached. At the lower forward end of the plate 7 is another arm 23 which is provided with a hole 24 for attachment of a towing line 25.

Coaxial with and encircling the fixed sleeve 9 is a lashing sleeve 26 which is provided with a longitudinal slot 27 and opening 38 and holes 42. The opening 38 is a small circular opening, centrally located midway along the length of the sleeve with the holes 42 positioned 90° distance from said opening 38 (see Fig. 5). The forward end of the lashing sleeve 26 is provided with an outwardly extending flange 28 and is encircled at its rear end by a collar 29 which has a lashing arm 30 formed integral with it. Arm 30 extends radially from said collar and is then bent at a right angle to extend longitudinally to approximately midway between the flange 28 and collar 29. Arm 30 is provided with a grommet 46 extending through an aperture in said arm, tensioning studs 47 and an eyelet 48, the functions of which will be hereinafter set forth.

A lashing wire drum 31 provided with a longitudinal slot 32 encircles and is coaxial with the lashing sleeve 26 and is further provided with holes 41 midway in its length, equidistant from the slot 32, and 180° apart (see Fig. 5). The lashing wire drum 31 is provided with a forward flange 33 and a rear flange 36, flange 33 having on its forward face a curved sheave plate 34 which is concentric with said flange 33 and with it forms a driving sheave or pulley for rotating the drum 31, as will be more fully described below.

Removably mounted between the forward flange 33 and rear flange 36 is a lashing wire cup 35 (see Figs. 1 and 5), having a stud 37 in its base, which rests across slot 32 of drum 31 and upon the sleeve 26 so that the stud 37 extends into the opening 38 of sleeve 26. A U-shaped locking strap 39, provided at each end with an inwardly extending stud 40, passes over the top of the cup 35 and down both sides of said cup so as to embrace opposite sides of the core of the drum 31. Locking strap 39 is held secure by the studs 40 which penetrate the openings 41 in the drum 31, and said studs also penetrate openings 42 of sleeve 26, thus performing the dual function of holding the cup in place on the drum 31 and also of locking the sleeve 26 and the drum 31 together so that they will rotate as a unit during the lashing operation. An opening in the strap 39, coaxial with the cup 35, is fitted with an eyelet 43 which provides an exit guide for lashing wire 44 as it pays out from its coiled position within the cup 35.

From the eyelet 43, the lashing wire 44 passes through the grommet 46 in the end of the lashing arm 30 and on opposite sides of the successive tensioning studs 47 to provide necessary tension and thence through eyelet 48 and around the messenger strand 19 and the cable 49 that is to be lashed, to the point on pole 50 where the end of the lashing wire 44 is attached.

The cable 49 is brought up from the ground over a roller 51 which is free to turn on an axle 52, which is supported by the plate 7. The upper concave surface portion of roller 51 is approximately a projection of the lower inner surface of the sleeve 9, so that the cable 49 is fed from roller 51 to the front aperture of the sleeve 9. The cable is then fed through the sleeve 9 to a position where the lashing wire 44, under tension, draws the cable 49 against the messenger strand 19, where it is lashed in place.

Figure 4:
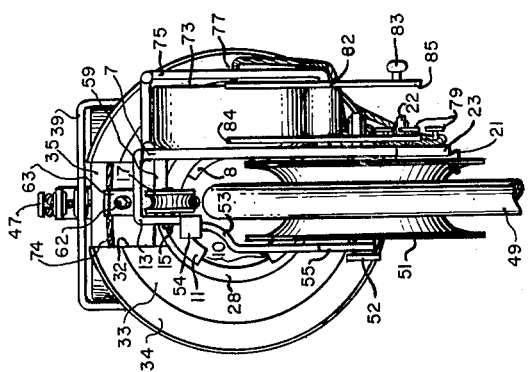
Fig. 4 is a front elevational view of the machine, taken along the line 4—4 of Fig. 1.

A guard 53, to retain the cables and loose wires in place as they pass over the roller 51 into sleeve 9, is pivotably mounted on axle 16 and extends downwardly and forwardly alongside the roller 51 and upwardly to a point where it is supported by a clip 54 which is an extension of the forward edge of rider wheel support 13. An arm 55 extends downwardly from the guard 53 to the axle 52 for support. The guard 53 can be swung upwardly about axle 16, thus permitting the placing of the rider wheels 17 and 18 over the messenger strand 19 and the positioning of the cable 49 over the roller 51, after which the guard 53 is lowered to the position shown in Figs. 1 and 4.

Figure 3:
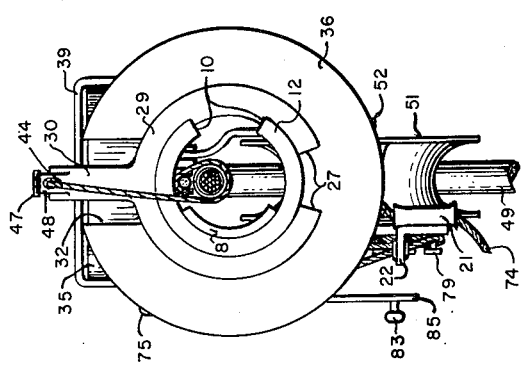
Fig. 3 is a rear elevational view of the machine, taken along the line 3—3 of Fig. 1.

When the machine is to be placed in operating position, as is shown in Fig. 1, the lashing sleeve 26 and the drum 31 are rotated until the slots 27 and 32 register with slot 10 of the fixed sleeve 9, to enable the machine, with guard 53 raised, to be placed initially over the strand 19 and cable 49, so that the strand 19 and the cable 49 pass through the fixed sleeve 9. Thereafter the sleeve 29 and the drum 31 are rotated to the positions shown in Figs. 1, 3 and 5 to facilitate the placement of the lashing wire cup 35 and threading of the lashing wire 44.

For preventing the machine from moving backward on the strand 19 when tension is released on the towing line 25, a braking wedge 56 (see Figs. 1 and 2) is provided. The braking wedge 56 will jam between the face of the rider wheel 18 and rider wheel support 14 under the pressure of a coil spring 57 which surrounds a rod 58 located between the braking wedge 56 and a stud 59. The rod 58 has the braking wedge 56 secured to one end, a head 60 to the other, and passes slidably through a hole in the stud 59 which is rotatably mounted on the plate 7. When it is desired to arrange for the machine to move rearwardly on the messenger strand 19, as when performing its unlashing operation the wedge 56 is moved forward by compressing the spring 57 and the nose of the wedge is placed in a recess 62 of the ear 63 which is formed integral with the forward edge of the rider wheel support 14, as shown (see Figs. 2 and 4).

Figure 6:
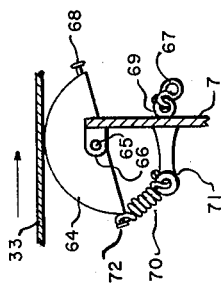
Fig. 6 is a horizontal section taken along the line 6—6 of Fig. 1, showing the relation of the parts involved in the braking action on the drum, during the lashing operation.

To control the rotational movement of the drum 31, that is, to permit the drum to rotate only counterclockwise or clockwise, the following restraining device is utilized. A braking cam 64 (Figs. 1, 2 and 6) is mounted rotatably on a pin 65 which is secured to a lip 66 formed on the rear edge of plate 7, as shown. When it is desired to perform lashing wherein only counterclockwise rotation (when viewed from the front of the machine, i. e., from the right in Fig. 1) of the drum is desired, a spring 70 extends from a stud 72 of the cam 64 to an eye 71 of the plate 7 as to permit the drum 31 to rotate counterclockwise, but to prevent clockwise rotation through friction due to wedge action against flange 33 as is shown in Fig. 6. The braking action may be removed entirely when a spring 67 which is secured to an eye 69, on the left side of the plate 7, is hooked on to the stud 68 of cam 64; thus the spring 67 balances spring 70, and the cam 64 is held free from the face of the flange 33.

Mounted on the left side of plate 7 is a drive wire cup 73 within which is a coil of drive wire 74, which is retained in place by a strap 75 hinged at one end to the plate 7. The drive wire 74 is brought out through an opening 77 in the strap 75 and thence through a guide eye 78, secured to the plate 7, and past opposite sides of successive studs 79, serving as snubbers, to provide tension upon drive wire 74 and thence through the left drive wire guide 22 and thence clockwise or counterclockwise around the sheave formed between the flange 33 and the curved sheave plate 34, depending upon whether it is desired to lash the cable 49 clockwise or counterclockwise. Having passed over the sheave plate 34, the drive wire is passed through the right drive wire guide 21 and thence extended to the pole 50, where it is made fast at a point lower than the level of the guide 21, so that the rotation of the lashing arm 30 will not cause it to strike the drive wire 74 between the pole 50 and the machine.

The operation of the machine above described can be briefly described as follows. The lashing operation is performed by pulling the machine forward along the strand 19 by means of the towing line 25. This may be done manually or by some other prime mover. Forward movement of the machine feeds the cable 49 over the roller 51 and through the fixed sleeve 9, and, at the same time, as one end of the drive wire 74 is securely attached to the pole 50, said wire will be payed out from the drive wire cup 73, past the snubber stubs 79 and over the sheave plate 34 effecting rotation of sleeve 26 and drum 31 as a unit. At the same time, as the lashing wire 44 is likewise secured at one end, forward movement of the device causes lashing wire to be payed out of the lashing wire cup as the lashing arm 30, carried by the collar 29, rotates about the messenger strand 19 and cable 49. This action places the lashing wire 44 spirally around the strand 19 and the cable 49 with tension, resulting from the snubbing action of the studs 47, and draws the cable 49 close to the strand 19.

When the end of the span is reached, the lashing wire 44 is temporarily clamped to the cable 49 and the strand 19, and adequate lashing wire is pulled out of the machine to complete the lashing of the span and the wire is then cut. The strap 39 and the lashing wire cup 35 are then removed from the machine, the driving wire 74 is released from the pole and removed from the sheave plate 34; the slot 27 in the lashing sleeve 26 and the slot 32 in the drum 31 are rotated to coincide with the slot 10 in the fixed sleeve 9. The guard 53 is then raised and the machine is lifted clear of the strand 19 and the cable 49. The lashing is completed by continuing the lashing by hand until the near pole is reached, where the free end of the lashing wire 44 is made fast to either the pole or to the messenger support.

In many instances, it may be desired, or necessary, to unlash cable already secured to a strand. As may be seen in Fig. 2, the cup 35 and the strap 39 are not employed during unlashing. The machine is placed over the cable and strand as above described, after the end of the lashing wire has been released from the near support and unwound for a short distance. The free end of the lashing wire is fed through the guide eye 48, past one or more of the studs 47 as required, to apply adequate tension, through the grommet 46 of the lashing arm 30 to an eye 80 in the drum 31, where it is made secure. The drive wire 74 is threaded as previously described, but should be clockwise around the sheave plate 34, if the lashing to be removed is counterclockwise or vice versa; and instead of being made fast to the pole 50, as in lashing, the drive wire 74 is now passed to the ground where tension can be applied in a forward direction to cause the machine to move backward along the strand 19 and the cable 49, unlashing the cable 49 from the strand 19 and lowering said cable to the ground over the roller 51. For unlashing, the braking wedge 56 must be placed in hole 62, to permit backward movement of the machine. The action of unlashing is caused by the rotation of the sheave 34 wrapping lashing wire 44 around the drum 31, and this causes the lashing arm 30 to rotate free of the drum 31, to unlash the cable 49 and to feed the recovered lashing wire 44 to the drum 31, and tension on the lashing wire 44 causes the machine to be drawn backward along the strand 19. When the end of the span is reached, the wire 44 is unwrapped from the drum 31 and the machine is removed from the strand 19 and cable 49, in the reverse of the manner in which it was placed in position.

For the purpose of respooling the driving wire 74 after the completion of one span and to prepare for the next one, and to respool lashing wire 44 removed from the cable, thus freeing the drum 31 for removal of the machine from the strand 19, a hand operated separable reel 81, having an inner flange 84 and an outer flange 85, provided to rotate on a spindle 82 which is supported by plate 7. The reel 81 is rotated by a knob 83 and the inner flange 84 is retained on the spindle 82, while the outer flange 85 is removable therefrom, thus permitting the wire spooled on the reel 81 to be removed therefrom as a coiled bundle for use in either the lashing wire cup, the driving wire cup, or for storage.

While there has been described herein one specific embodiment of the invention, in its preferred form, it is obvious that modifications and changes can be made therein without departing from the spirit and scope of the invention. For example, directional rotation of the drum 31 and the lashing arm secured thereto can be effected in either clockwise or counterclockwise rotation during the lashing stage. The foregoing description reveals the usual conventional application of the machine to lashing and unlashing cables in the commercial type of aerial cable construction. The forms of braking and tensioning mechanisms shown herein have been chosen for simplicity, however, it is understood that other forms of mechanisms producing the same results may be utilized. However, it is to be understood that special applications and uses of the machine are such that the machine can be held in fixed position and wires or cables pulled through it at the same time as driving wire 74 is pulled over curved sheave plate 34 thus effecting the lashing together of the wires and cables drawn through the machine.

I claim:

1. A device for lashing cable to and unlashing cable from a messenger strand comprising a framework for riding along a strand, a drum rotatably mounted thereon, a lashing mechanism for rotating said drum comprising a circular member fixed to said drum and rotatably drivable relative to said framework, a container of lashing wire on said drum, a guide for said lashing wire laterally positioned to and mounted on said drum, means for selectively securing said guide to said drum whereby during lashing the guide and drum are mutually rotated and lashing wire is payed out of said container about said cable and messenger strand, said last mentioned means including means for releasing said guide from rotation with said drum whereby said guide is rotatably free of said drum and under the stress of said lashing wire during an unlashing operation by which said lashing wire is unwound from said cable and messenger strand and wound upon said drum.

2. A device for lashing cable to and unlashing cable from a messenger strand comprising a framework for riding along a strand, a drum rotatably mounted thereon, a lashing mechanism for rotating said drum comprising a circular member fixed to said drum and rotatably drivable relative to said framework, a container of lashing wire on said drum, a guide for said lashing wire laterally positioned to and mounted on said drum, means for selectively securing said guide to said drum whereby during lashing the guide and drum are mutually rotated and lashing wire is payed out of said container about said cable and messenger strand, said last mentioned means including means for releasing said guide from rotation with said drum whereby said guide is rotatably free of said drum and under the stress of said lashing wire during an unlashing operation by which said lashing wire is unwound from said cable and messenger strand and wound upon said drum, and releasable braking means to permit movement of the framework along the strand in only one direction during lashing.

3. A device for lashing cable to and unlashing cable from a messenger strand comprising a framework for riding along a strand, a drum rotatably mounted thereon, a lashing mechanism for rotating said drum comprising a circular member fixed to said drum and rotatably drivable relative to said framework, a container of lashing wire on said drum, a guide for said lashing wire laterally positioned to and mounted on said drum, means for selectively securing said guide to said drum whereby during lashing the guide and drum are mutually rotated and lashing wire is payed out of said container about said cable and messenger strand, said last mentioned means including means for releasing said guide from rotation with said drum whereby said guide is rotatably free of said drum and under the stress of said lashing wire during an unlashing operation by which said lashing wire is unwound from said cable and messenger strand and wound upon said drum, and releasable braking means to permit rotation of the guide in only one direction during lashing.

4. A device for lashing cable to and unlashing cable from a messenger strand comprising a framework for riding along a strand, a drum rotatably mounted thereon, a lashing mechanism for rotating said drum comprising a circular member fixed to said drum and rotatably drivable relative to said framework, a container of lashing wire on said drum, a guide for said lashing wire laterally positioned to and mounted on said drum, means for selectively securing said guide to said drum whereby during lashing the guide and drum are mutually rotated and lashing wire is payed out of said container about said cable and messenger strand, said last mentioned means including means for releasing said guide from rotation with said drum whereby said guide is rotatably free of said drum and under the stress of said lashing wire during an unlashing operation by which said lashing wire is unwound from said cable and messenger strand and wound upon said drum, and a first releasable braking means to permit movement of the framework along the strand in only one direction during lashing, and a second releasable braking means to permit rotation of the guide in only one direction during lashing.

5. A device for lashing cable to, and unlashing cable from, a messenger strand, comprising a framework, a first releasable one-way braking means carried by the framework for permitting the movement of the device along the strand in only one direction when lashing, and allowing the device to move in either direction when unlashing, a longitudinally slotted stationary sleeve fixed to said framework, a longitudinally slotted rotatable sleeve coaxial with said stationary sleeve, the rotatable sleeve having an arm secured thereto, a drum coaxial with the sleeves, the drum and the arm being separately rotatable, releasable means to lock the drum and the arm together for mutual rotation, the locking means operating during lashing and being released during unlashing, a laterally positioned lashing wire cup carried by the device and mutually rotatable with the arm, lashing wire in the cup, means for effecting rotational movement of the drum, and a second releasable one-way brake means carried by the framework for permitting the drum to rotate in only one direction during lashing, and when released permitting the drum to rotate in either direction during unlashing, whereby during lashing, the arm and the cup are mutually rotated and lashing wire is payed out from the cup and guided by the arm and spirally wound about the cable and the strand and, during unlashing, the drum is rotated and the lashing wire is wound upon it and the arm rotates independently of the drum and guides the wire on to the drum.

LELAND H. STANFORD.

References Cited in the file of this patent
UNITED STATES PATENTS

| Number | Name | Date |
|---|---|---|
| 1,846,767 | Steuer | Feb. 23, 1932 |
| 1,935,585 | Tornblom | Nov. 14, 1933 |
| 2,153,072 | Bookout | Apr. 4, 1939 |
| 2,300,035 | Neale | Oct. 27, 1942 |
| 2,402,172 | Macy | June 18, 1946 |